United States Patent
Altherr et al.

[11] Patent Number: 6,145,859
[45] Date of Patent: Nov. 14, 2000

[54] HYDRO-PNEUMATIC DRIVEN AXLE SUSPENSION

[75] Inventors: August Altherr, Kaiserslautern; Fritz Glaser, Zweibrücken; Werner Heim, Friedelsheim; Ewald Rudy, Sinsheim; Heinz Schwegler, Neulussheim; Michael Teich; Martin Trinler, both of Mannheim; Klaus Zahn, Östringen, all of Germany

[73] Assignee: Deere & Company, Moline, Ill.

[21] Appl. No.: 09/179,568

[22] Filed: Oct. 27, 1998

[30] Foreign Application Priority Data

Oct. 31, 1997 [DE] Germany .......................... 197 48 224

[51] Int. Cl.⁷ ............................................... B60G 9/99
[52] U.S. Cl. ......................... 280/124.159; 280/124.157; 280/124.116; 280/5.514; 280/6.157
[58] Field of Search ............................ 280/5.514, 6.157, 280/6.158, 6.159, 124.116, 124.128, 124.158, 124.159; 180/349

[56] References Cited

U.S. PATENT DOCUMENTS

| | | | |
|---|---|---|---|
| 3,845,833 | 11/1974 | Glaser et al. | 280/124.158 |
| 4,046,218 | 9/1977 | Blaisdell et al. | 180/349 |
| 5,044,455 | 9/1991 | Tecco et al. | 180/89.13 |
| 5,047,938 | 9/1991 | Yokote et al. | 364/424.05 |
| 5,083,275 | 1/1992 | Kawagoe et al. | 364/424.05 |
| 5,137,299 | 8/1992 | Jones | 280/707 |
| 5,271,632 | 12/1993 | Bice | 280/124.158 |
| 5,338,010 | 8/1994 | Haupt | 267/64.16 |
| 5,466,007 | 11/1995 | Smith | 280/840 |
| 5,515,274 | 5/1996 | Mine et al. | 364/424.05 |
| 5,517,847 | 5/1996 | Campbell et al. | 73/11.07 |
| 5,530,648 | 6/1996 | Lavey | 364/424.05 |
| 5,538,266 | 7/1996 | Martin et al. | 280/6.12 |
| 5,547,211 | 8/1996 | Runkel | 280/708 |
| 5,555,501 | 9/1996 | Furihata et al. | 364/424.05 |
| 5,619,413 | 4/1997 | Oakley | 364/424.046 |
| 5,855,379 | 1/1999 | Buma et al. | 280/5.514 |
| 6,007,072 | 12/1999 | Yoon | 280/5.514 |

FOREIGN PATENT DOCUMENTS

| | | |
|---|---|---|
| 0 670 230 | 2/1995 | European Pat. Off. . |
| 38 34 693 | 6/1989 | Germany . |
| 39 19 303 | 12/1989 | Germany . |
| 40 08 831 | 9/1991 | Germany . |
| 41 20 758 | 1/1992 | Germany . |
| 41 38 208 | 5/1993 | Germany . |
| 34 28 397 | 3/1994 | Germany . |
| 42 42 448 | 3/1994 | Germany . |
| 43 08 460 | 9/1994 | Germany . |
| 195 41 823 | 5/1997 | Germany . |
| 196 43 263 | 4/1998 | Germany . |

OTHER PUBLICATIONS

US Appln. Ser. No. 895,382, filed Jul. 16, 1997.
Peter Pickel et al. "What Chances do Spring–mounted Tractors Have" in the German periodical "Landtechnik" 10/90, pp. 363–366.
German periodical "profi test" Number 8/96, pp. 14–17.
Prospectus of Fendt Company: "Farmer" HD11/95/15, p.14.

*Primary Examiner*—J. J. Swann
*Assistant Examiner*—L. Lum

[57] ABSTRACT

A hydro-pneumatic axle spring suspension system for the driven axle of an agricultural utility vehicle, in particular for the front axle of an agricultural tractor, is described, which contains at least one hydraulic cylinder arranged between the vehicle chassis and axle body. The rod end chamber and the piston end chamber of the hydraulic cylinder are each connected with at least one accumulator. Furthermore a valve circuit supplied by a hydraulic pump is provided for the control of the level, which controls the pressure of the accumulators as a function of the load on the axle body.

To improve the operating and spring characteristics of the utility vehicle it is proposed that the mechanical and hydraulic components be designed for a spring suspension under maximum load of the axle body. The valve circuit is configured and controlled in such a way that in the accumulators an adequate pressure is constantly maintained in order to make possible a spring suspension of the axle body under all load and operating conditions of the vehicle.

22 Claims, 3 Drawing Sheets

HYDRO-PNEUMATIC DRIVEN AXLE SUSPENSION

BACKGROUND OF THE INVENTION

The invention relates to a hydro-pneumatic front axle suspension system for the driven axle of an agricultural utility vehicle, in particular for the front axle of an agricultural tractor, with a pair of hydraulic cylinders coupled between vehicle chassis and axle body. The cylinders have a rod end chamber and a piston end chamber, each connected to at least one accumulator. A valve circuit supplied by a hydraulic pump controls the position of the chassis relative to the axle, and controls the pressure in the accumulators as a function of the load on the axle body.

In order to increase vehicle operational safety and comfort at higher vehicle speeds on roads, dirt roads and around curves, the front axle of agricultural utility vehicles can be resiliently or "spring" suspended from the vehicle chassis. For this purpose one or more hydraulic cylinders can be coupled between the vehicle chassis and the front axle, with piston end chambers and/or rod end chambers connected to accumulators and a position control valve system supplied by a hydraulic pump. For front loader operations or for operation in the ground the resilient suspension system is blocked mechanically or hydraulically (Peter Pickel et al. "What Chances do Spring-mounted Tractors Have" in the German periodical "Landtechnik" 10/90, pages 363–366). This is accomplished by blocking the supply lines to the hydraulic cylinder or by draining its piston end chamber (see DE-A-195 41 823), so that the chassis is firmly coupled to the front axle (see German periodical "Profi" Number 8/96, pages 14–17).

Such blocking of the spring suspension is necessary in order to avoid variations on the control performance of a power lift or hitch (see DE-A-38 34 693). For example, in DE-C-42 42 448, front axle spring suspension considered to be undesirable during plowing, and a manually actuated disengagement of the spring suspension is proposed.

In operations with front loader, front cultivator or front stacker a spring suspension is also considered to be detrimental since a particularly precise implement control and guidance is required in such situations. Hence, Prospectus of Fendt Company:"Farmer", HD11/95/15, on page 14, proposes to block the spring suspension with push-button actuation.

DE-A-43 08 460 proposes an operating device which enabled the operator to select between a manual and an automatic blocking of the spring suspension, where the automatic blocking occurs as a function of certain criteria, such as front loader operation or plowing.

Furthermore, DE-A-42 42 448 proposes, in case of electrical failure, to close a blocking valve between the hydraulic cylinder and accumulator automatically, so that the tractor remains ready to operate, although with reduced comfort.

EP-A-0 670 230 discloses a pressurized fluid supply for a hydro-pneumatic axle spring suspension with level control for a utility vehicle. This includes a hydraulic installation supplied by a hydraulic pump connected with accumulators that are in turn connected with chambers situated above and below the piston of actuating cylinders of the axle spring suspension. When the pressure falls below that required for the desired level, the upper cylinder chamber is filled by the hydraulic pump via the hydraulic installation. In order to maintain the supply of pressurized fluid, upon selective application of various pump systems, the actuation of a consumer connected to the hydraulic pump is arbitrarily simulated, in case of a need for pressurized fluid by the axle suspension. For certain operating applications the spring suspension is disengaged and the vehicle axle is blocked with respect to the vehicle chassis, by releasing the pressure in the upper cylinder chamber so that the pressure in the second cylinder chamber forces the axle against a stop on the chassis.

In front axle spring suspensions which are subject to heavy loads, such as are encountered in front loader operations or with the employment of a heavy front implement, in which the spring suspension is always blocked, the hydraulic and mechanical spring suspension components are designed for relatively low loads for reasons of space and cost, as would be required by operation on a road. In such a system the accumulators will have a relatively small volume with a correspondingly steep spring characteristic.

SUMMARY OF THE INVENTION

An object of the present invention is to provide a hydro-pneumatic axle suspension system for the driven axle of an agricultural utility vehicle, which system improves the operating characteristics of the utility vehicle.

Another object of the present invention is to provide a suspension system which is appropriate for a driven, rigid full floating front axle.

These and other objects are achieved by the present invention, wherein an hydro-pneumatic front axle spring suspension provides resilient or spring suspension under all load and operating conditions of the agricultural utility vehicle. The suspension system supports a vehicle chassis with respect to a driven, rigid full floating front axle, and includes a pair of generally vertical hydraulic cylinders which are arranged approximately symmetrically on both sides of a full floating axis of the axle. The spring suspension of the axle remains effective, in particular, in all front loader operations, in all field and ground operations and in slow and rapid transport operations. Even with the occurrence of failures in hydraulic or electrical components the spring suspension should be maintained and should not be disengaged as opposed to previous practice.

The suspension system of the invention includes mechanical and hydro-pneumatic components, such as the hydraulic cylinders, the accumulators, the valve circuit and the pressure supply, are designed to provide a resilient suspension under maximum loads on the axle body. The maximum axle load to be absorbed by the spring suspension may amount, for example, to 70 kN [kilo Newtons] in an agricultural tractor with an allowable total weight of 9000 kg and an allowable useful load of 4000 kg. Furthermore, the valve circuit maintains sufficient pressure in the accumulators, the piston end chamber and the rod end chamber, in order to make possible the full spring deflection of the axle body under all conditions of load and operation of the vehicle, where the spring rate is adjusted to the current actual load on the axle body.

Despite the reservations of the experts, this design is practical and highly advantageous. The invention provides improves safety, enhances comfort and improves the stability of steering in all operating conditions. Vibrations transmitted to the operator are reduced which makes the operation more pleasant and less fatiguing. Since the operator very rapidly becomes accustomed to the stable operating performance with the spring suspended axle, he will make more effective use of the vehicle. With increased operating stability the vehicle can be operated faster than with vehicles without resilient suspensions. A switch between spring supported and unsprung axle suspension, as is common in the current state of the art, can lead to dangerous operating conditions, since the operator does not always consciously sense the switch to the unsprung condition and therefore overtaxes the vehicle.

In contrast to earlier assumptions, a spring suspension of the front axle brings advantages for front loader operations and operations in the ground. Due to the preload in the accumulators, the hydraulic cylinders are constantly loaded and maintain the wheels on the ground, so that they do not lift off when traversing uneven ground, and the transmittal of forces to the ground is guaranteed at all times. Therefore, the vehicle chassis maintains its position during operation over uneven ground in a more stable manner than with a vehicle with an unsprung axle suspension. As a result, less severe control movements are required of an attached implement hitch control system.

Even in front loader operations the feared disadvantages do not appear. Rather, a position or level control system is able to equalize variations in height caused by load changes rapidly and precisely. Momentary load variations such as occur, for example, when operating over uneven ground, are not equalized by the level control arrangement. In front loader operations with an active front axle spring suspension the result is a more stable operating performance than with an unsprung front axle.

The invention is preferably applied to a full floating axle suspension as described by this applicant in German patent application DE 196 43 263.4, filed on Oct. 19, 1996 and published Apr. 23, 1998 (Applicant's Docket No. 8707-DE), which is hereby incorporated by reference herein. In a preferred embodiment of the invention two hydraulic cylinders are provided, each having upwardly oriented piston end chambers located above piston rods which are connected to the axle body. The piston end chambers are connected to each other and to a pair of piston end accumulators connected in parallel. The rod end chambers are connected to each other and are connected in parallel directly to at least one rod end accumulator.

Preferably, the valve circuit includes an electromagnetically controlled level control valve which controls communication between a hydraulic pump, a reservoir, the rod end chambers and the piston end chambers. The control valve is controlled by a control unit as a function of deviations from a mean level detected by a position sensor. A pilot-controlled check valve is arranged between the level control valve and the rod end chambers and between the level control valve and the piston end chambers. The check valves block any fluid backflow out of the rod end chambers or the piston end chambers.

The valve circuit includes a pressure control that controls the pressure in the rod end chambers to a mean, essentially constant value. Thereby, the pressure in the rod end chambers provides a pre-load and establishes an operating range of the piston end accumulator. The piston end chambers are exposed to the force of the weight of the chassis as well as the pressure of the pre-load in the rod end chambers. This makes it possible to cover a wide range of loads with the spring system, without having to switch between spring accumulators with various pre-loads (see, for example, DE patent 41 38 208). The pre-load in the rod end chambers protects the piston end accumulator against under or overloads.

Furthermore, the valve circuit adjusts the pressure in the piston end chambers as a function of a varying added load applied to the axle. The position of the axle, which depends on the load, can be determined from signals of a position sensor that detects any change in the distance between the axle body and the chassis.

Fundamentally, the level or position adjustment or control is active under all operating conditions and establishes a pre-set mean height position of the chassis above the axle body. The control maintains the height position independent of any change in the static loads. The mean height position can be established by a calibration process, in which the valve circuit is controlled in order to cover the entire range of height positions of the hydraulic cylinders. The end points (upper and lower stops) of the movement of the height position are used to determine the mean height position which is stored in memory.

In a preferred embodiment the valve circuit includes at least one electromagnetically controlled level control valve which controls the communication of fluid to and from the piston end chamber and/or the rod end chamber. The level control valve is controlled by an electric control unit as a function of signals from a position sensor.

The components of the suspension system and the connecting lines are selected so that its operation is damped. However, it may be desirable to adjust the damping rate to the particular operating conditions. Therefore, the invention provides an adjustable proportional valve between the chambers of the hydraulic cylinders and the associated accumulators, by means of which the damping rate of the suspension system can be adjusted or controlled.

The suspension system includes a steering arm which is rigidly connected to the axle and is connected in a joint to the vehicle chassis, and which can absorb or react to horizontal tension or compression forces in the longitudinal direction of the vehicle. This permits the support of the axle to react to forces and improves the dynamics of the suspension system. For example, if the vehicle is braked or accelerated the vehicle body tends to pivot about the rear axle, so that the hood drops during braking and rises during accelerations. The steering arm helps to limit such vehicle body motion.

DESCRIPTION OF THE PREFERRED EMBODIMENT

Figure 1:
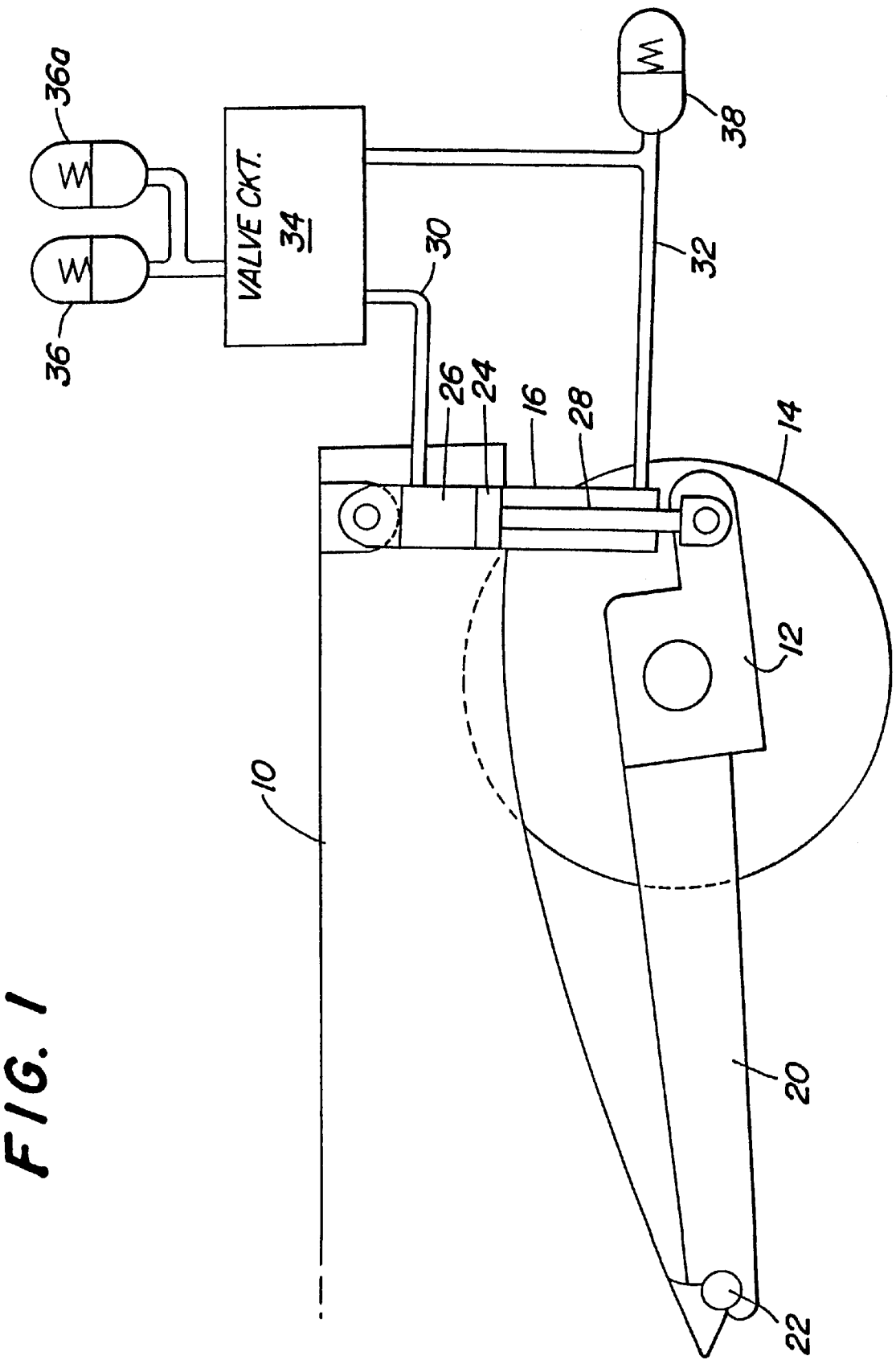
FIG. 1 is a schematic view of a front axle suspension system according to the invention.

FIG. 1 shows a portion of a vehicle chassis 10, a front axle body 12 and a front wheel 14 of an agricultural tractor (not shown). The front axle body 12 preferably is a central full floating axle, that aspect not being shown in FIG. 1. For further details, German patent application DE 196 43 263.4, filed on Oct. 19, 1996 and published Apr. 23, 1998 (Applicant's Docket No. 8707-DE), is hereby incorporated by reference herein.

Between the chassis 10 and the front axle body 12 two hydraulic cylinders 16, 17 are arranged essentially symmetrically about the full floating axle, only one of which can be seen in FIG. 1. The hydraulic cylinders 16, 17 each have one end attached at a joint to the chassis 10. The other end of the hydraulic cylinders 16, 17 are attached to the front axle body 12 at joints which are in front of the centerline of the front axle body 12.

The front axle body 12 is supported on the chassis 10 through a steering arm 20 which extends in the longitudinal direction of the vehicle and which can absorb tension or compression forces. The front end of the steering arm 20 is fastened rigidly to the front axle body 12. Its rear end is connected through a ball joint 22 to the chassis 10. The ball joint 22 makes it possible for the front axle body 12 to pivot upward or downward. A sideways movement of the front axle body 12 is limited by a Panhard rod (not shown). The drive shaft (not shown) for the front axle extends within the steering arm 20. The steering arm 20 should be as long as possible. Preferably, the steering arm 20 has a length that is greater than the effective diameter of the tires of the front wheels, for example, 800 mm.

If the agricultural tractor has a wheelbase of 2650 mm., the length of the steering arm 20 tube may amount to approximately 1000 mm. and the attaching joints of the hydraulic cylinders 16, 17 to the front axle body 12 may be located approximately 200 mm. ahead of the centerline of the front axle body 12.

The length of the steering arm 20 is preferably dimensioned in such a way that the braking torque is largely compensated, or at least by 50%. If the steering arm is too short, the braking torque is overcompensated and the vehicle rears up. This is considered detrimental. Rather during acceleration and braking the vehicle should maintain its horizontal position as much as possible. This is the case when a compensation is performed between the braking effect (flattens itself out) and change in tension force (rearing up). If the steering arm is too short, righting moments can occur that are a function of the load which lead to undesirable variations in tension or drawbar force in which the vehicle does not perform smoothly.

It has been shown to be advantageous if the joint between the steering arm and the vehicle chassis lies in the vicinity of the transverse vertical plane defined by the center of gravity of the vehicle and/or if the hydraulic cylinders are arranged ahead of the centerline (axis of rotation of the front wheels) of the rigid axle. The length of the steering arms may preferably amount to 40% of the wheelbase. The steering arm is preferably configured in such a way that it covers, at least partially, the drive axle extending in the longitudinal direction of the vehicle, and protects it against dirt and damage.

The hydraulic cylinders 16, 17 are each provided with a cylinder housing which receives an axially movable piston 24. The piston 24 divides the cylinder housing into an upper piston end chamber 26, 27 and a lower rod end chamber 28, 29. The piston end chambers 26, 27 and the rod end chambers 28, 29 are connected through hydraulic lines 30, 32 with a valve circuit 34, with two piston end accumulators 36, 36a and with a rod end accumulator 38. The accumulators 36, 36a and 38 are nitrogen gas pressurized accumulators of known manufacture. Preferably, the total nominal volume of the piston end accumulators is at least twice as large as the total nominal volume of the rod end accumulator or accumulators. German patent DE-42 42 448 discloses a valve circuit suitable for use with the present invention, and is incorporated by reference herein. However, in contrast to this known valve circuit, the valve circuit 34 of the present invention has no blocking valve between the piston end chambers and the associated accumulators.

Figure 2:
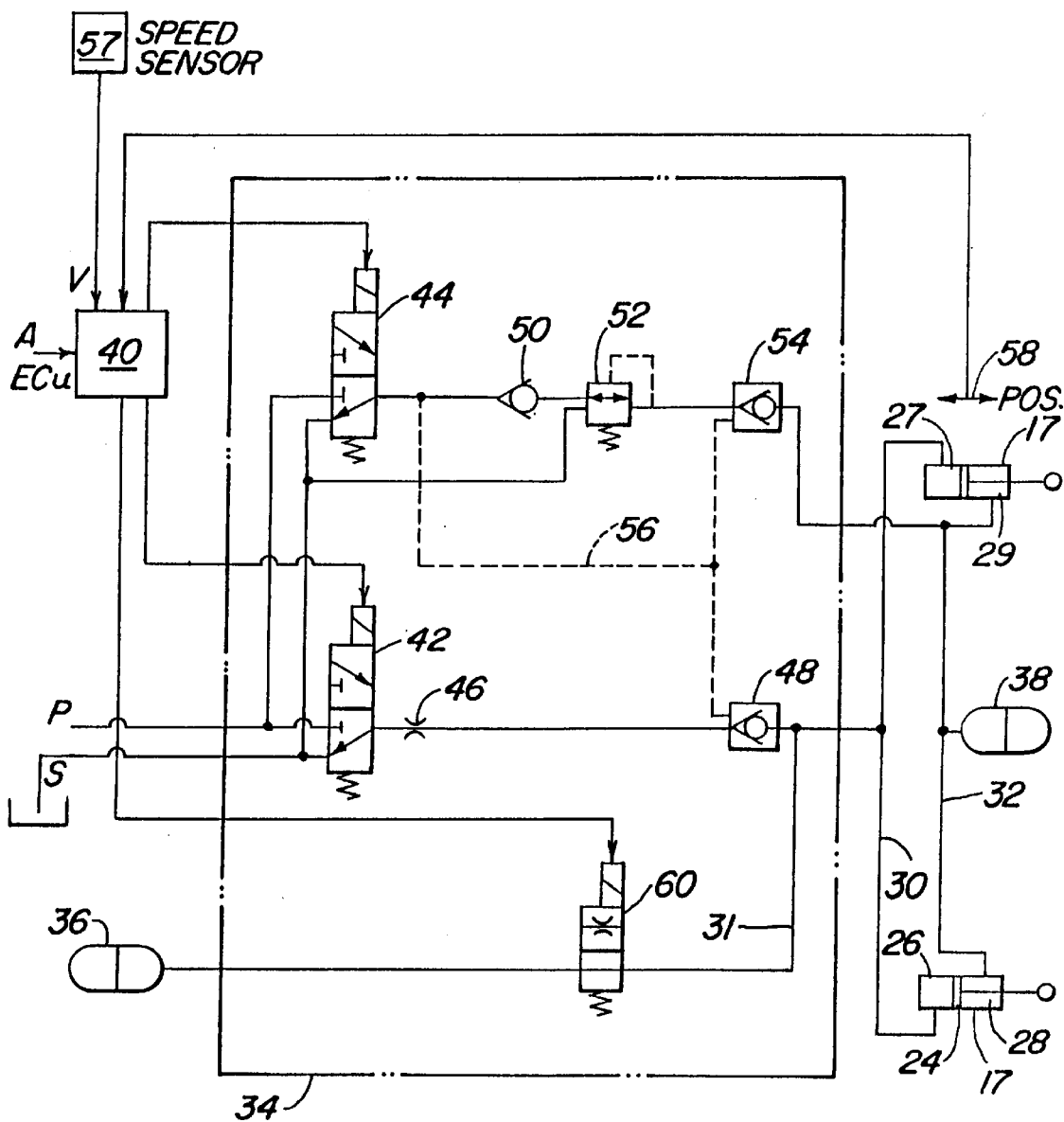
FIG. 2 is a diagram illustrating the control system and the hydraulic circuit of the present invention.

Referring now to FIG. 2, the piston end chambers 26, 27 are connected through the hydraulic line 30 with each other and through a further hydraulic line 31 with the two piston end accumulators 36, 36a, of which only one is shown in FIG. 2. The rod end chambers 28, 29 are connected through the hydraulic line 32 with each other and with the rod end accumulator 38. The connections between the piston end chambers 26, 27 and the piston end accumulators 36, 36a as well as those between the rod end chambers 28, 29 and the rod end accumulator 38 are not completely blocked under any operating conditions, so that the spring suspension remains continuously effective. The valve circuit 34 may consist of a single component in which several valves are contained of which some can be controlled by an electric or electronic control unit 40.

The valve circuit 34 includes a first and a second electromagnetic valve 42, 44, each of which has two positions and each of which has three ports. Each first port is connected with a hydraulic pump P. Each second port is connected with a hydraulic reservoir or pump S. The third port the first hydraulic valve 42 is connected through a throttling restriction 46 and a first pilot controlled check valve 48 with the hydraulic line 30 and the piston end chambers 26, 27. The third port of the second hydraulic valve 44 is connected through a check valve 50, a pressure control valve 52 and a second pilot controlled check valve 54 with the hydraulic line 32 and the rod end chambers 28, 29. The two pilot controlled check valves 48, 54 are controlled through control lines 56 by the pressure obtaining at the third port of the second control valve 44.

The control unit 40 receives signals A from a manually operated input unit (not shown) by means of which the control unit 40 can be programmed and through which parameters of the front axle spring suspension system can be provided as input, as well as signals V of a vehicle speed sensor 57. A position sensor 58 detects the position of the height of the vehicle chassis 10 above the front axle body 12 and transmits corresponding position signals to the control unit 40. The control unit 40 continuously generates mean values from the position sensor signals. If the mean values exceed or fall below a pre-set position tolerance range that extends about an average height position, then a level equalization is performed.

If the vehicle chassis 10 deviates from a pre-set height position in response to a load change, then the control unit 40 transmits electric signals to the two electromagnetic valves 42, 44, which operate as level control valves, in order to bring these, if applicable, out of their rest position shown (electromagnetic valves are de-energized), in which each of the third ports is connected to the reservoir and brings them into an energized position, in which each of the third ports is connected with the hydraulic pump. If the vehicle speed falls below a pre-set value, the electromagnetic valves 42, 44 are not energized, so that these remain closed and no level control is performed.

If the position sensor 58 detects a rise in the position of the vehicle chassis 10, then the control unit 40 initiates a downward control, in which the first electromagnetic valve 42 remains in the de-energized condition shown and the second electromagnetic valve 44 is energized and connects its third port with the hydraulic pump P. The increasing pressure in the control lines 56 opens the pilot controlled check valves 48, 54 and the pressure control valve 52 imposes a pre-determined pressure in the hydraulic line 32 and in the rod end chambers 28, 29. The pressure in the piston end chambers 26, 27 and the associated accumulator 36 is bled off through the check valve 48 and the electromagnetic valve 42 to the reservoir, until the mean level position is transmitted by the position sensor 58. Then the third port of the electromagnetic valve 44 is connected with the reservoir S, the pressure in the control lines 56 drops and the check valves 48, 54 close, so that any further flow of pressurized fluid out of the piston end chambers 26, 27 is prevented.

If the position sensor 58 detects a lowering of the vehicle chassis, then the control unit 40 initiates an upward control, in which both electromagnetic valves 42, 44 are energized and their third ports are connected with the hydraulic pump P. The increasing pressure in the control lines 56 opens the pilot controlled check valves 48, 54 and the pressure control valve 52 imposes a pre-determined pressure in the hydraulic lime 32 and in the rod end chambers 28, 29. The pressure in the piston end chambers 26, 27 and the associated piston end accumulator 36 is built up until the mean level position is transmitted by the position sensor 58. Then the third ports of the electromagnetic valves 42, 44 are connected with the reservoir S, the pressure in the control lines 56 drops and the check valves 48, 54 close, so that a further flow of pressurized fluid into the piston end chambers 26, 27 is prevented. As also shown in FIG. 2, a proportional valve 60 may be inserted into the hydraulic line 31 which can be controlled by the control unit 40 and which permits regulation of the damping of the suspension system.

Figure 3:
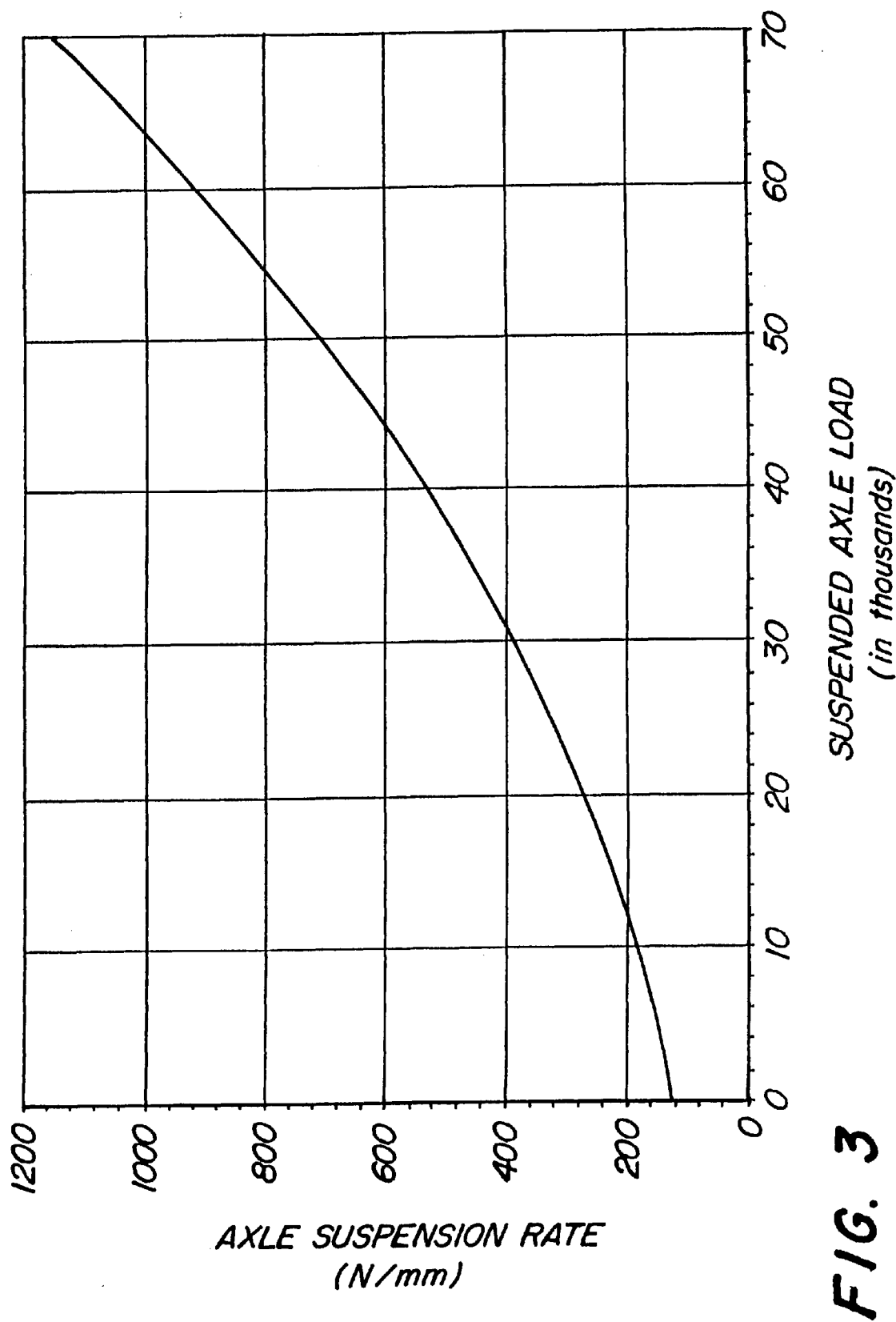
FIG. 3 is a diagram which illustrates the relationship between a spring rate of the axle suspension and axle load.

FIG. 3 shows, as an example, the theoretical axle spring rate in N/mm. of the front axle spring suspension system as a function of the load in N on the axle supported by the spring suspension which is appropriate for a 96 KW agricultural tractor with an empty weight of approximately 5400 kg and which exhibits the following characteristics.

| | |
|---|---|
| Cylinder bore: | 50 mm. |
| Piston rod diameter: | 38 mm. |
| Transmission ratio (wheel/cylinder) (lever arm wheel/lever arm cylinder): | 0.868 |
| Piston end chamber accumulator volume/axle: | 2800 cm³ |
| Gas preload: | 32 Bar |
| Rod end chamber accumulator volume/axle: | 1000 cm³ |
| Gas preload: | 33 Bar |
| Politropix exponent: | 1.3 |
| Constant pressure in rod end chamber: | 92 Bar |
| Max. axle spring extension: | 52 mm. |
| Max. axle spring deflection: | 52 mm. |

At an axle load of 12,000 N (unloaded front axle) the spring rate is approximately 200 N/mm. and at an axle load of 64,000 N (front axle loaded with front weights and front loader) the spring rate is approximately 1,000 N/mm.

For low axle loads of 10,000 N, the slope of the spring characteristic shown is approximately 0.0075 (N/mm)N and for high axle loads of 70,000 N it is approximately 0.024 (N/mm)/N. Thus, the spring characteristic has a comparatively low slope. The slope can be reduced further if the pressure in the rod end chamber is not maintained at a constant value, but is varied as a function of the load.

The position signals are continuously analyzed to determine first mean values over time intervals from 2 to 10 seconds, preferably approximately 6 seconds. The exact time interval is established as a function of the inertia of the entire control circuit as well as the vibration periods of the lowest natural frequency of the vehicle. That should amount to at least five vibration periods. Control signals for the filling or draining of the hydraulic fluid are transmitted to the level control valve only if the first mean value exceeds a pre-set tolerance range of a target level. The tolerance range is, for example, within ±7.5% of the total spring deflection (of, for example, approximately 100 mm) to either side of the target level. The target level normally corresponds to the mean spring deflection. Thereby a level equalization occurs not on the basis of the natural vibration of the vehicle, but only if the load has changed over longer time intervals.

It is also advantageous to form second mean values from the position sensor signals over time intervals from 0.3 to 2 seconds, preferably of approximately 0.8 seconds. As soon as the second mean value lies again in the tolerance range, the at least one level control valve ends the filling or draining process. The time constant of the second mean value is selected in such a way that an oscillation of the position of the axle beyond the target value is avoided. This depends, in particular, on the pump output and the volume of the hydraulic cylinders and the accumulators.

If the sensed position value remains outside the tolerance range, for example for 10 to 30 seconds, a system failure is assumed. Then the level control is disengaged and an optical and/or acoustic error message is issued. However, the suspension remains resilient or spring-like. This avoids an over control of the height adjustment and excessive oscillation.

It is advantageous that the level control be prevented from operating when the vehicle falling below a pre-set speed (for example, 1.5 km/h) or upon the occurrence of a failure in the electrical or hydraulic components, in order to avoid an action unexpected by the operator (buckling equalization) of the suspension. For example, if the vehicle is stopped and its loading is changed by mounting or removing an implement, then the vehicle inclines. This should not be equalized when the vehicle is stopped. The level control can be blocked by closing the valves of the valve circuit. At this point the spring suspension of the axle remains effective since the hydraulic connection between the piston end chambers and the piston end accumulators as well as between the rod end chambers and the rod end accumulators remain open so that an exchange of pressurized fluid can take place.

The performance of the vehicle during failure can be read from the amplitudes and frequencies of the position sensor signal. High amplitudes and low frequencies point to a relatively soft suspension of the tractor. By narrowing the connecting channel in the proportional valve the stiffness of the spring suspension can be increased. It is also possible to reach similar conclusions from pressure measurements at the accumulators or the chambers of the hydraulic cylinders.

The accumulators are, for example, nitrogen gas pressurized accumulators. They must provide sufficiently large volumes in order to maintain the desired axle spring rate under all load conditions. In particular, a suspension spring rate should be avoided that is so soft that the axle body comes into contact with the vehicle chassis or makes an impact with it, even at relatively low axle loads.

The accumulators are provided with a progressive spring characteristic. The slope of the spring characteristic (variation of the axle spring rate with axle load) for accumulators of large volume is lower than that of accumulators of lower volume. It is particularly advantageous to employ accumulators with a relatively low slope of the spring characteristic so that the spring characteristic of the axle spring suspension at low front axle loads of, for example, 10 kN lies in the region between 0.003(N/mm)/N and 0.01(N/mm)/N, preferably approximately 0.0075(N/mm)/N, while at high axle loads of, for example, 70 kN the slope of the spring characteristic lies between 0.015(N/mm)/N and 0.035 (N/mm)/N, preferably approximately 0.025(N/mm)/N. Here the axle spring rate is given in Newtons per mm of spring deflections as a function of the axle load. For example, the spring rate for a front axle load of 10 kN lies at 100 to 250 N/mm, preferably at 180 N/mm (a relatively soft spring), and at an axle load of 70 kN it lies at 1000 to 1300 N/mm, preferably 1150 N/mm (relatively stiff spring). In the design of the accumulators a sufficiently stiff spring characteristic should be considered for the load range of front loader operations, in order to keep the vehicle stable against buckling when the load is raised. In the load range for plowing the spring rate should also not be too low.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydro-pneumatic suspension system for a front axle of a vehicle, having a pair of hydraulic cylinders, coupled between a chassis of the vehicle and an axle body, each cylinder having a rod end chamber and a piston end chamber, each rod end chamber being connected to a rod end accumulator and to a valve circuit fed by a hydraulic pump, the valve circuit controlling a position of the chassis relative to the axle body, and controlling fluid pressure in the accumulator as a function of load on the axle body, the improvement wherein:

the suspension system include components which are designed to resiliently suspend the chassis under all loads expected to be applied to the axle body;

a position sensor senses a position of the chassis relative to the axle and generates a position signal representative thereof;

the valve circuit maintains a pressure in the accumulator sufficient to resiliently suspend the axle body under all load and operating conditions, the valve circuit comprising a pair of electromagnetically controlled level control valves, each level control valve having a first port communicated with the hydraulic pump and a second port communicated with a reservoir, one of the level control valves having a third port communicated with the rod end chamber via a first pilot controlled check valve, the other level control valve having a third port communicated with the piston end chamber via a second pilot controlled check valve, each check valve preventing fluid backflow out of the corresponding rod end chamber and piston end chamber; and a control unit controls the valve circuit as a function of the position signal.

2. The suspension system of claim 1, wherein:

each piston end chamber is oriented upward and each cylinder having a piston rod which is connected to the axle body, the piston end chambers are directly connected with each other and with a pair of piston end accumulators connected in parallel, and the rod end chambers are directly connected with each other and with the rod end accumulator.

3. The suspension system of claim 1, wherein:

the valve circuit includes a pressure control valve which maintains an essentially constant pressure in the rod end chambers, and the valve circuit controls the pressure in the piston end chambers as a function of changing axle load.

4. The suspension system of claim 3, wherein:

a position sensor continuously senses a position of the chassis relative to the axle body; and a control unit determines a mean value of said sensed position over a pre-determined time interval, and adjusts pressure in the cylinders only if said mean value falls outside of a pre-set range by a certain amount.

5. The suspension system of claim 1, wherein:

a position sensor senses a position of the chassis relative to the axle body;

the valve circuit includes a pair of electromagnetically controlled level control valves which control communication of fluid to and from the piston end and rod end chambers, and the level control valves are controlled by an electric control circuit as a function of signals from the position sensor, the control unit continuously calculating mean position values over time intervals from 2 to 10 seconds, and transmitting control signals to the level control valves when the mean value exceeds a pre-determined tolerance range by a target value.

6. The suspension system of claim 5, wherein:

the control unit continuously generates a second mean value from the position sensor signals over time intervals from 0.2 to 3 seconds, and the control unit transmitting control signals to the level control valves to stop fluid communication therethrough if the second mean value lies within the tolerance range.

7. The suspension system of claim 6, wherein:

the control unit continuously generates a second mean value from the position sensor signals over time intervals of approximately 0.8 seconds.

8. The suspension system of claim 5, wherein:

the control unit continuously calculates mean position values over time intervals of approximately 6 seconds.

9. The suspension system of claim 1, wherein:

a vehicle sensor generates a vehicle speed signal, and a control unit deactivates position control when the vehicle speed falls below a pre-set limit.

10. The suspension system of claim 1, wherein:

the valve circuit is controlled by an electric control unit, the control unit monitoring the suspension system and, in response to a failure condition, the control unit ceasing positional control and causing the suspension system to maintain a resilient suspension of the chassis.

11. The suspension system of claim 1, wherein:

the axle is a driven, rigid, full floating front axle;

the hydraulic cylinders are arranged approximately symmetrically about a floating axis of the front axle, oriented essentially vertically; and a control arm extends in a longitudinal direction and is fastened rigidly to the front axle and is coupled to the chassis at a joint.

12. The suspension system of claim 11, wherein:

the vehicle includes front wheels with tires mounted thereon; and the control arm has a length that is greater than an effective diameter of said tires.

13. The suspension system of claim 11, wherein:

the hydraulic cylinders are coupled to the axle body at a connecting joint which is located at a distance to a centerline of the front axle, said distance being between one third to one tenth of a length of the control arm.

14. The suspension system of claim 11, wherein:

the joint of the control arm lies approximately in a vertical transverse plane in which lies a center of gravity of the vehicle.

15. A hydro-pneumatic suspension system for a front axle of a vehicle, having a pair of hydraulic cylinders, coupled between a chassis of the vehicle and an axle body, each cylinder having a rod end chamber and a piston end chamber, each rod end chamber being connected to a rod end accumulator and to a valve circuit fed by a hydraulic pump, the valve circuit controlling a position of the chassis relative to the axle body, and controlling fluid pressure in the accumulator as a function of load on the axle body, the improvement wherein:

the suspension system include components which are designed to resiliently suspend the chassis under all loads expected to be applied to the axle body;

each piston end chamber is oriented upward and each cylinder having a piston rod which is connected to the axle body, the piston end chambers are directly connected with each other and with a pair of piston end accumulators connected in parallel, and the rod end chambers are directly connected with each other and with the rod end accumulator, the piston end accumulators have a total volume which is at least twice as large as a volume of the rod end accumulator; and the valve circuit maintains a pressure in the accumulators sufficient to resiliently suspend the axle body under all load and operating conditions.

16. The suspension system of claim 15, wherein:

the accumulators are constructed so that the suspension system has a suspension spring characteristic with a slope, which varies as a function of axle loads, and which for front axle loads of approximately, 10 kN ranges from 0.003 to 0.01 (N/mm)/N, and, which for axle loads of approximately 70 kN, ranges from 0.015 to 0.035 (N/mm)/N.

17. The suspension system of claim 16, wherein:

said slope varies as a function of axle loads from approximately 0.0075 (N/mm)/N to approximately 0.025 (N/mm)/N.

18. The suspension system of claim 15, wherein:

the load on the axle body produces a pressure in the piston end chamber, and the hydraulic cylinders, accumulators and the valve circuit cooperate so that, at axle loads of approximately 10 kN there results a spring rate of 100 to 250 N/mm, and at axle loads of 70 kN there results a spring rate of 1000 N/mm to 1300 N/mm.

19. The suspension system of claim 18, wherein:

the pressure in each piston end chamber is a function of load applied to its cylinder, and the hydraulic cylinders, accumulators and the valve circuit cooperate so that, at axle loads of approximately 10 kN there results a spring rate of approximately 180 N/mm, and at axle loads of 70 kN there results a spring rate of approximately 1150 N/mm.

20. The suspension system of claim 15, wherein:

a proportional valve is arranged between the piston end chambers and the piston end accumulators, the proportional valve regulating the a damping rate of the suspension system.

21. A hydro-pneumatic suspension system for a front axle of a vehicle, having a pair of hydraulic cylinders, coupled between a chassis of the vehicle and an axle body, each cylinder having a rod end chamber and a piston end chamber, each rod end chamber being connected to a rod end accumulator, each piston end chamber being connected to a piston end accumulator, said chambers and accumulators being connected to a valve circuit fed by a hydraulic pump, the valve circuit controlling a position of the chassis relative to the axle body, and controlling fluid pressure in the accumulators as a function of load on the axle body, the improvement wherein:

the suspension system includes components which are designed to resiliently suspend the chassis under all expected loads on the axle body; and the valve circuit maintains a pressure in the accumulators sufficient to resiliently suspend the axle body under all load and operating conditions, the valve circuit maintaining fluid communication between the rod end chamber and the piston end chamber and the corresponding accumulator under all operation conditions.

22. The suspension system of claim 21, wherein:

the valve circuit includes a proportional valve through which a damping characteristic of the suspension system may be adjusted.

* * * * *